Jan. 4, 1966 K. W. RAMSEY ET AL 3,227,854
APPARATUS FOR PERFORATING THERMOPLASTIC FILM
Filed Feb. 8, 1963 2 Sheets-Sheet 1
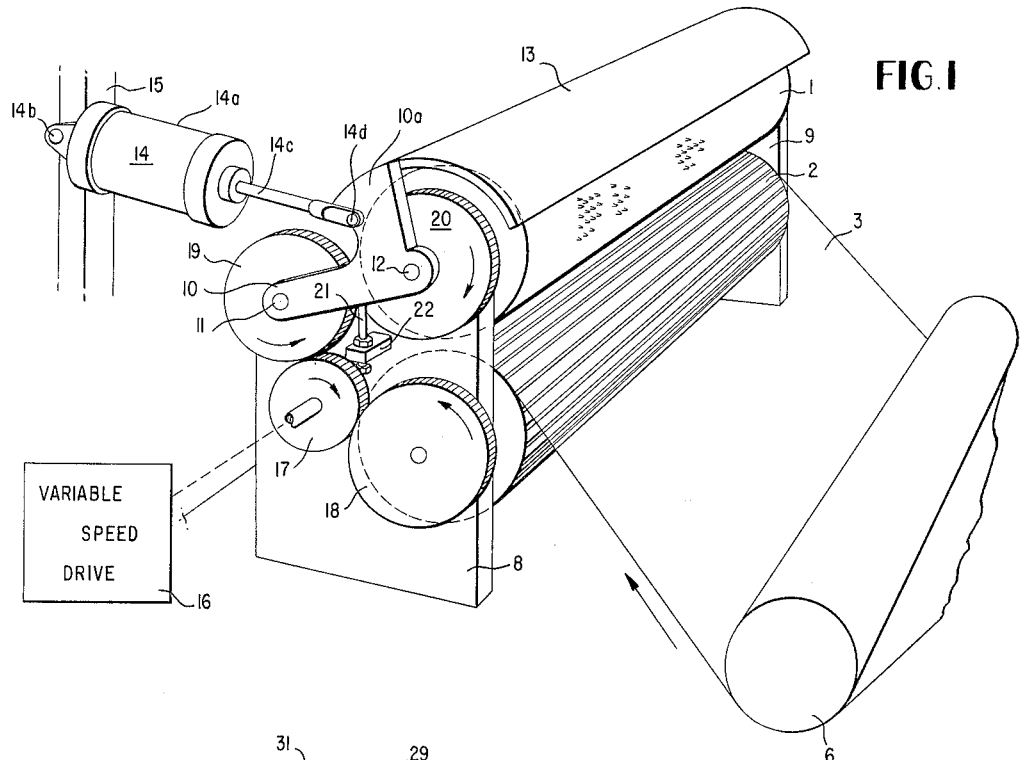
INVENTORS
KNOX W. RAMSEY
RONALD H. KING
BY
Glenn, Palmer and Matthews
ATTORNEYS INVENTORS
KNOX W. RAMSEY
RONALD H. KING
BY
Glenn, Palmer and Matthews
ATTORNEYS United States Patent Office 3,227,854
Patented Jan. 4, 1966

3,227,854
APPARATUS FOR PERFORATING
THERMOPLASTIC FILM
Knox W. Ramsey and Ronald H. King, Waynesboro, Va.,
assignors to Reynolds Metals Company, Richmond,
Va., a corporation of Delaware
Filed Feb. 8, 1963, Ser. No. 257,300
8 Claims. (Cl. 219—244)

This invention pertains to an apparatus for perforating thermoplastic film. In particular, it pertains to such an apparatus which is especially suitable for perforating continuous webs of film material such as thin, bioriented, polyvinyl chloride. Perforated films of this nature are commonly utilized as a ventilated, food packaging or wrapping material.

Prior attempts to produce perforate, thermoplastic film material have encountered substantial obstacles. One prior art apparatus comprises a heated, pin carrying, film perforating roll which cooperates with an annularly grooved, anvil roll to perforate film material fed therebetween. In practice it has been found that this apparatus tends to produce longitudinally extending ridges in the perforated film which are generally undesirable. It has also been determined that this apparatus tends to produce uneven or non-uniform film perforations. The character of this apparatus is such that the anvil roll is water cooled so as to prevent film distortion tendencies during the perforating operation. As will be readily appreciated, such water cooling introduces substantial structural complexities into the apparatus.

The heating of the perforating roll of the above described prior art apparatus inherently induces longitudinal roll expansion, particularly where long rolls are employed to handle wide webs of film. Considerable difficulty has been encountered in respect to misalignment of the perforating roll pins and the anvil roll, annular grooves caused by such longitudinal expansion of the pin roll.

The feeding of thin, thermoplastic film material has also occasioned problems. Prior art systems have incorporated a nip roll type of advancing mechanism to feed film to a perforating and anvil roll assembly and a nip roll mechanism to transport perforated film away from the pin and anvil roll assembly. This arrangement, of course, entails substantial structural complexity. Even with this dual, infeed and outfeed drive arrangement, the feeding of a thermoplastic web between the pin and anvil roll has not been considered entirely satisfactory.

In prior art film perforating apparatus, separation of the perforating roll and anvil roll has been accomplished by moving the anvil roll away from the pin roll. This movement inherently produces undesirable slack in the web being perforated.

In recognition of the deficiencies of prior art film perforating devices, it is an object of this invention to provide a mechanism which obviates the difficulties heretofore encountered in the perforation of thermoplastic film.

It is a particular object of the invention to provide a film perforating apparatus which eliminates the prior art problem of thermally induced, pin roll expansion which causes misalignment between perforating roll pins and anvil roll grooves.

Another object of the invention is to provide an apparatus which achieves air cooling of the thermoplastic film during the perforating operation.

An additional principal object of the invention is to provide a film perforating apparatus which avoids the longitudinal film grooving or ridging tendency associated with prior art structures and which produces a more uniform type of film perforation than has heretofore been obtainable.

Another major object of the invention is to provide a perforating apparatus including an improved and simplified drive structure for transporting film between the perforating and anvil roll members of the apparatus.

A further object of the invention is to provide a film perforating apparatus wherein relative separation of a perforating and anvil roll may be achieved without interrupting the driving connections extending to these rolls and without causing slack to be formed in the web film being transported through the perforating apparatus.

A final object of the invention is to provide a film perforating apparatus characterized by structural simplicity and high operational reliability.

In accomplishing the objects of this invention there is envisioned an apparatus including a first roll mounted for rotation about a longitudinal axis. A plurality of circumferentially spaced rows of longitudinally aligned and longitudinally spaced film perforating pins project radially from the periphery of this first roll. Means are supplied for heating the pins carried by the first roll. A second roll is spaced from the first roll and mounted for rotation about a longitudinal axis parallel to the longitudinal axis of the first roll. A plurality of circumferentially spaced, longitudinally extending grooves are interspersed on the periphery of the second roll with these ridges. The grooves of the second roll are individually adapted to receive the outer ends of a row of pins carried by the first roll. Means are provided for guiding film between the first and second roll with the film being in surface contact with ridges of the second roll.

In describing the invention, reference will be made to a preferred embodiment of the apparatus illustrated in the accompanying drawings. In these drawings:

FIG. 1 is a perspective, schematic representation of the perforating and anvil roll components of the apparatus, including the roll driving mechanism and a mechanism for moving the perforating roll away from the anvil roll;

FIG. 2 is a schematic, elevational representation of the manner in which film is guided toward, through, and away from the perforating apparatus;

FIG. 3 is a transverse, sectional view of the perforating and anvil roll components of the FIG. 1 apparatus, with the viewer facing the apparatus as disposed in FIG. 1.

FIGS. 3 and 4 illustrate structural details of the perforating roll and anvil roll, including electrical slip rings carried by the pin roll, which structural details are not shown in the schematic view of FIG. 1.

Figure 4:
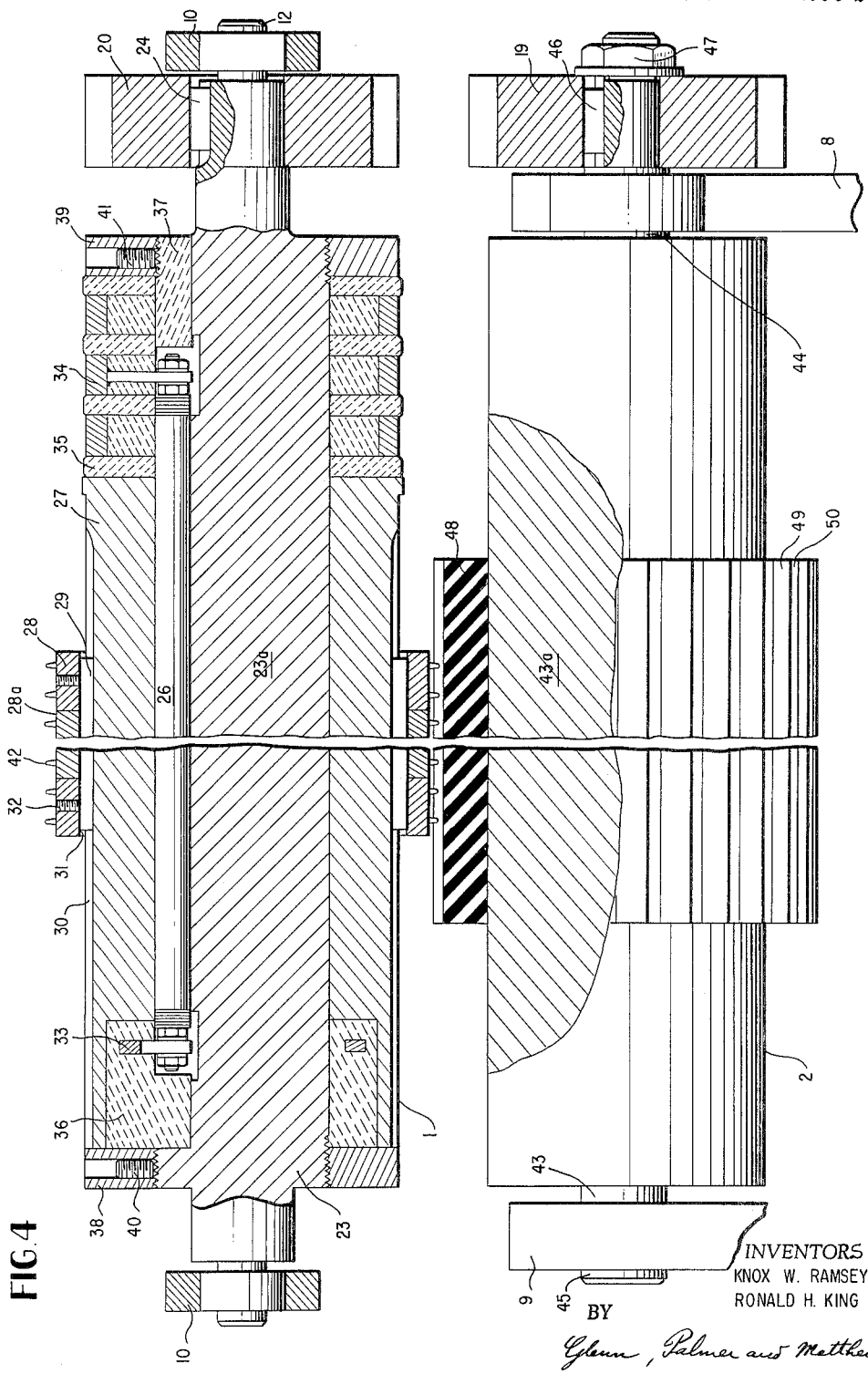
FIG. 4 is a fragmentary longitudinal view of the perforating and anvil roll components of the FIG. 1 apparatus as viewed along the section line 4—4 of FIG. 3.

The perforating apparatus of this invention, as illustrated in FIGURE 1, is characterized by a cylindrical, elongate, film perforating roll 1. Perforating roll 1 cooperates with a cylindrical, elongate anvil roll 2 to effect the perforation of a web of thermoplastic film 3 fed therebetween. As schematically shown in FIGURE 2, the over-all system for transporting film to, through and away from the film perforating apparatus comprises a supply roll 4 which constitutes a source of the web 3 and a take-up roll 5 disposed on the outfeed side of the perforating apparatus to re-roll the film subsequent to the perforation operation.

Idler roll means such as 6 and 7 are disposed on the infeed and outfeed sides, respectively, of the perforating apparatus, so as to cause the web 3 to engage and conform to a portion of the upper periphery of the anvil roll 2. As illustrated, perforating roll 1, anvil roll 22, supply roll 4, take-up roll 5 and idler rolls 6 and 7 are preferably disposed with their longitudinal axes of rotation in horizontal alignment.

Anvil roll 2 is journaled in a frame schematically illustrated in FIGURE 1 as comprising end walls 8 and 9. Perforating roll 1 is mounted on the frame for pivotal movement relative to the anvil roll 2. As shown in FIGURE 1, this pivotal mounting arrangement may comprise a pair of pivot arms 10 pivotally secured at one end to the frame. The shaft or axis of rotation of the perforating roll 1 is journaled in the other, i.e. movable, ends of these pivot arms. One such pivot arm 10, as shown in FIGURE 1, is pivotally secured at pivot axis 11 to frame wall 8. A spindle end 12 of the shaft of perforating roll 1 is journaled in the free end of each pivot arm 10 as illustrated. Desirably, a shield 13 is associated with the perforating roll 1. Such a shield may be arcuate in character, being spaced from and curving around a portion of the upper periphery of the perforating roll 1. Such a shield 13, as illustrated in FIGURE 1, may be carried by lateral projections 10a integrally formed on the pivot arm 10.

Pivotal movement of the perforating roll 1 may be effected by the hydraulic or pneumatic piston and cylinder assembly 14. Assembly 14 may comprise a cylinder 14a pivotally mounted at one end 14b to a stationary frame member 15. A piston rod 14c, extending from a piston within the assembly 14, is pivotally mounted at one end 14d to a pivot arm 10. As will be appreciated, a cylinder and piston assembly 14 may be provided for each of the two pivot arms 10.

Retraction or extension of the piston rods 14c so as to effect movement of the perforating roll 1 away from or toward the anvil roll 2 may be initiated by conventional, automatic or manually operated control means.

A drive system is provided for imparting positive rotation to the perforating roll 1 and the anvil roll 2. This drive system effects coordinated rotation of the anvil roll 2 and the perforating roll 1 such that the rate of linear movement of tangentially aligned portions or components of these rolls is the same.

A schematically represented drive arrangement is illustrated in FIGURE 1. This drive includes a conventional, variable speed drive mechanism 16 which may comprise any of several commercially available drive units. Drive mechanism 16 may effect rotation of a main drive gear 17 mounted on frame member 8. Main drive gear 17 may impart rotation to an anvil roll drive gear 18 and to an intermediate drive gear 19. Gear 19 has its axis aligned with the pivot axis 11 of the pivot arm 10. Intermediate drive gear 19 meshes with a perforating roll driving gear 20, which gear 20 has its axis aligned with the axes of spindles 12 of the perforating roll 1. As will be appreciated, with this arrangement the pivot arms 10 may be pivoted about the pivot axis 11 without interrupting the driving connection between the intermediate drive gear 19 and the main drive gear 17 or the perforating roll driving gear 20. The gear 20 may be mounted on its hub so as to be adjustable with respect to its rotary position. In this way, the apparatus may be adjusted to obtain the desired meshing relationship of perforating roll pins and anvil roll grooves hereinafter described.

The positive positioning of pivotable, perforating roll 1 relative to stationary, anvil roll 2 may be effected by means such as an adjustable stop 21 associated with one or both pivot arms 10. Each stop 21 is adapted to engage the under surface of a pivot arm 10. Stop 21, as illustrated, may comprise a threadably adjustable rod mounted in a bracket 22 extending from frame member 8.

The internal structure and relative operational positions of perforating roll 1 and anvil roll 2 are illustrated in FIGURES 3 and 4.

Perforating roll 1 comprises a shaft 23 which terminates at its ends in spindles 12 which are journaled in pivot arms 10. Drive gear 20 may be secured to shaft 23 by a key 24 as shown. The intermediate portion 23a of shaft 23 is enlarged to define the core of the perforating roll. As shown in FIGURE 3, this core 23a is provided with a plurality of circumferentially and uniformly spaced and longitudinally extending peripheral grooves 25. In each groove 25 there is disposed a conventional, elongate, electrical resistance type heating unit 26. A cylindrical, heat distributing cover 27 is telescoped over the core portion 23a so as to cover and be adjacent to the heating units 26 disposed in the core grooves 25.

A plurality of axially aligned and mutually abutting, heat conductive, pin bearing rings 28 are telescoped over the cylindrical, heat distributing cover 27. Rings 28 are preferably heated prior to their mounting on the cover 27 so as to obtain a tight thermal fit with this cover. Proper alignment of the rings 28 relative to the cover 27 may be obtained by means of conventional keys 29 extending along cover grooves 30 and projecting into ring grooves 31. If desired, set screws 32 may be employed to more positively secure the rings 28 to the perforating roll assembly.

The disposition of heating elements on the core 23a preferably involves the illustrated arrangement wherein three equally spaced heating units 26 are disposed to form a conventional three-phase, Y-type circuit. Viewing the apparatus as shown in FIGURE 4, the left end of each heating unit 26 is connected to a common, annular, bus bar 33. The other end of each heating unit 26 is separately connected to one of three annular slip rings 34 disposed at the right end of the perforating roll 1 as viewed in FIGURE 4. With the perforating roll 1 rotating, the slip rings 34 may be engaged by conventional, commutator brushes or equivalent contact elements so that a conventional, three-phase power network may be employed to cause the heating of resistance units 26.

In order to avoid a tendency for the perforating roll 1 to become cooler at its outer ends than at its central portion, it may be desirable to vary the rate of heat output along the longitudinal axis of the heating units 26. This may be accomplished by increasing the resistance of the unit 26 heating elements toward the outer ends of the units 26 so as to provide a greater degree of heating near the ends of these units and thus a greater degree of heating near the roll ends.

Slip rings 34 are separated by annular insulating disks 35. Insulating material 36 may be employed to surround the connection of the annular bus bar 33 with the left ends of the heating units 26 as viewed in FIGURE 4. Similarly, insulating material 37 may be employed to fill and close the ends of core grooves 25. The assembly of components in the perforating roll 1 may be secured by annular securing rings 38 and 39 which are threadably mounted on the left and right ends respectively of the perforating roll 1, as shown in FIGURE 4. These retaining rings 38 and 39 may be secured by set screws 40 and 41 respectively.

The assembled perforating roll 1 includes a plurality of thermally conductive film perforating pins 42 which project radially outwardly from the outer peripheral roll surface as defined by outer ring surfaces 28a. Each perforating pin 42 desirably is of a generally outwardly tapered configuration. The pins 42 are disposed on the rings 28 so as to be arranged in circumferentially spaced rows. The pins aligned in each row are longitudinally spaced so as to form a desired perforation pattern.

Anvil roll 2 includes a shaft 43 having spindle-like end portions 44 and 45 journaled respectively in frame members 8 and 9. Drive gear 19 may be secured to portion 44 of shaft 43 through a conventional key 46. Drive gear 19 may be positively held on the shaft portion 44 by a threaded nut 47.

An elongate, annular core cover 48 fabricated of resilient material such as rubber is telescoped over an enlarged, core-defining portion 43a of shaft 43. The resilient material employed in the cover 48 encircling the anvil roll 2 may be a type of commercially available elastomer known as Hypalon and may have a durometer value of between 40 and 65.

Resilient cover 48 includes a plurality of longitudinally extending, radially projecting ridges 49. Resilient ridges 49 are interspersed with grooves 50 which extend radially inwardly of the periphery of the cover 48. Each groove 50 is defined by radially extending ridge walls 49a. The spacing of grooves 50 is such as to insure their proper mating alignment with the rows of pins 42 carried on perforating roll 1. Each groove 50 is thus adapted to receive the outer ends of a row of pins 42 carried by the perforating roll 1.

The operational position of the perforating roll 1 relative to the anvil roll 2 is such as to allow a film 3 to pass between the perforating and anvil roll in engagement with ridges 49 of the anvil roll but spaced from the peripheral surfaces 28a which define the outer periphery of the perforating roll 1. This spacing is achieved through appropriate manipulation of the adjustable abutment members (21) which engages the pivot arms 10. As free entry of the perforating roll pins 42 into the anvil roll grooves 50 is desired, the anvil roll 2 is oriented about its axis in relation to the perforating roll 1 such that pins 42, when they enter a groove 50, are spaced from the groove side walls. Proper spacing of the axes of the perforating roll 1 and the anvil roll 2 maintains the outermost tips of the pins 42 spaced from the base of the grooves 50.

The guiding effect of the idler rollers 6 and 7 is such as to insure that the film web 3 engages several ridges 49 on the upper peripheral portion of the anvil roll 2, between the anvil roll and perforating roll. Thus, as shown in FIGURE 3, a web of film 3 conforms to a portion of the arcuate periphery of the anvil roll 2.

The apparatus as described is particularly suited to the perforation of wide rolls of thermoplastic film such as bi-oriented, polyvinyl chloride having a thickness as thin as 0.4 to 2 mils. As is well known in the art, this film is highly heat shrinkable in character. The apparatus may be readily employed in the perforation of films having a width such as five feet. During the perforation operation the film may be advanced through the apparatus at a rate such as 350 feet per minute.

To properly penetrate such film and effect a fusing and reinforcing of the film perforations, the surface temperature of the perforating pin rings 28 may be maintained at a level such as 500° F. In one commercially satisfactory perforating structure adapted to handle film widths up to five feet, the perforating roll 1 and anvil roll 2 are both sized so as to have outer diameters of approximately five inches. Their length is such as to provide a five foot width of pin bearing rings 28. The pin rows on the perforating roll 1 and the grooves on the anvil roll 2 are circumferentially spaced such that their centers are approximately one-half inch apart. The pins incorporated on the periphery of the perforating roll in this apparatus have a height of approximately ⅛ inch and a base width also of approximately ⅛ inch. These pins taper outwardly to a point. The uniformly spaced anvil roll grooves employed with this perforating roll configuration have a width of approximately 3/16 of an inch and a depth of approximately 3/16 of an inch. A satisfactory anvil roll and perforating roll spacing allows the tips of pins such as those specified to extend into the anvil roll grooves approximately 1/16 of an inch.

In the operation of the apparatus, a web 3 of plastic film is threaded through the over-all system generally as shown in FIGURE 2. Movement of the web 3 through the system is initiated with the perforating roll 1 raised out of engagement with the anvil roll 2. This raising prevents an undesired accumulation of heat near the surface of the slow-moving web during the web accelerating period, which accumulation might induce severe warping or shrinking of the film 3.

It should be noted that in effecting the separation of the perforation roll 1 and the anvil roll 2, the position of the web of film 3 supported by anvil roll 2 remains unchanged. In this manner, the roll separation does not create any formation of slack in the web 3. As will be appreciated, such slack, when formed in webs of thin film materials such as polyvinyl chloride, might induce web fouling or breaking when slack removal was attempted.

After the web has been accelerated to operating speed the piston rod 14c is moved outwardly so as to restore the perforating roll 2 to the desired operating position relative to the anvil roll 2.

The web 3, as shown in FIGURE 3, curves around the upper portion of the anvil roll 2 so as to be engaged by a plurality of radially disposed ridges 49. The outer ends of these ridges are in surface contact with the under surface of the web 3 and serve to frictionally engage and advance the web through the perforating apparatus. The longitudinally ridged and resilent character of the periphery of the anvil roll 2 insures a particularly effective degree of web advancing engagement between the anvil roll 2 and the web 3. Indeed, the positive drive achieved by the resilient, longitudinal ridges of the anvil roll 2 is sufficiently effective as to eliminate the need for the separate infeed and outfeed structures employed in the prior art.

As the anvil roll 2 rotates, the ridges 49 interspersed with grooves 50 function as vanes so as to induce an air disturbance or flow about the periphery of the rotating anvil roll 2. This air flow, schematically illustrated in FIGURE 3, is effective to produce a significant cooling of the advancing web 3. This cooling prevents thermal shrinkage and distortion of the firm 3 which might otherwise be caused by heat radiating from the perforating roll 1.

Within the perforating roll 1, the heating units 26 generate heat which is transmitted uniformly from the heat distributing cover 27 through the pin carrying rings 28 to the film perforating pins 42. Undesirable heat radiation and heat loss away from the perforating roll 1 is prevented by the curved heat shield 13.

The perforation achieved by the present structure has been found to be particularly effective and uniform and unaccompanied by the blemishes associated with the use of the prior art, annularly grooved, anvil roll arrangement. Annularly grooved roll structures tended to form longitudinal ridges in the web being perforated in the vicinity of the annular grooves. This ridging effects web penetration so as to cause the formation of uneven or non-uniform holes. With the present longitudinally grooved, anvil roll structure, the tendency to form longitudinal ridges in the plastic web is avoided. Doubtless due, to a considerable degree, to the cooling effect of the anvil roll induced air circulation, the web is maintained sufficiently cool during the perforating operation so as to prevent the formation of transversely extending web ridges in the vicinity of the longitudinal, anvil roll grooves 50. Thus, as will be appreciated, in eliminating perforation distorting, ridge forming tendencies, the present invention produces an improved product, having more uniform perforations than has been previously obtained.

During the perforating operation changes in the degree of heating of roll 1 or non-uniform heating along the axis of the roll might cause longitudinal shifting of the positions of the pins 42. With long rolls of the type described, such shifting would be material. However, due to the longitudinally extending groove configuration, such expansion produces no problems of pin and groove alignment as would be involved with annularly grooved anvil rolls. When perforating roll expansion occurs, the pins of the present invention are merely freely displaced along the axis of the anvil roll grooves.

In describing this invention the advantages attendant upon its structural uniqueness have been made apparent. These advantages include the elimination of thermal expansion problems which would induce perforating roll pin and anvil roll groove misalignment, the obtaining of an improved perforated film product having more uniform perforations and lacking the undesired longitudinal grooving or ridging associated with the product of prior art structures, and the obtaining of an improved, film feeding and roll manipulating arrangement.

While the invention has been described with reference to a preferred embodiment of a perforating apparatus, it will be apparent to those skilled in the art that certain departures may be made from the disclosed structure. For example, through the employment of suitable drive means which would properly coordinate the rate of peripheral movement of the perforating and anvil rolls, it would be possible to employ perforating and anvil rolls having different diameters. The internal structure of the perforating and anvil rolls might be modified from the internal structures illustrated. Similarly, variations might be made in the disclosed width, depth, orientation and configuration of the anvil roll ridges and grooves and the width, length, configuration, spacing and pattern layout of perforating roll pins. It is likewise apparent that changes might be effected in the schematically illustrated roll drive, roll moving, and heat shield structures.

Other modifications, additions, and deletions in the disclosed apparatus might occur to those skilled in the art which would be well within the scope of the invention as defined in the appended claims.

What is claimed is:

1. An apparatus for perforating thermoplastic film, said apparatus comprising:
  a first roll mounted for rotation about a longitudinal axis;
  a plurality of circumferentially spaced rows of longitudinally aligned and longitudinally spaced film perforating pins, said pins projecting radially from the periphery of said first roll;
  means for heating said pins;
  a second roll spaced from said first roll and mounted for rotation about a longitudinal axis parallel to the longitudinal axis of said first roll;
  a plurality of circumferentially spaced, longitudinally extending, and resilient ridges formed on the outer periphery of said second roll;
  a plurality of circumferentially spaced and longitudinally extending grooves on the outer periphery of said second roll interspersed with said ridges, said grooves of said second roll being individually adapted to receive the outer ends of a row of pins carried by said first roll; and
  mens for guiding film between said first and said second roll with said film being in surface contact with ridges of said second roll, said ridges being adapted to so contact said film with said film being spaced from said periphery of said first roll.
  said ridges and grooves alternating around the circumference of said second roll such that, with some of said ridges in contact with said film, others of said ridges will be approaching said film and still others will be moving away from said film during rotation of said second roll.

2. An apparatus as described in claim 1 including drive means for causing rotation of said first roll and said second roll in timed relationship whereby grooves of said second roll will continue to receive the outer ends of pins of said first roll while said first roll and second roll are rotated.

3. An apparatus as described in claim 2, including means for moving said first roll away from said second roll without interrupting the driving connection between said first roll and second roll and said drive means.

4. An apparatus for perforating thermoplastic film, said apparatus comprising:
  a first roll mounted for rotation about a longitudinal axis, said first roll having
    an elongate core including a plurality of circumferentially spaced and longitudinally extending grooves formed on its outer periphery,
    a generally cylindrical, heat distributing cover telescoped over said core, and
    a plurality of axially aligned, heat conductive ring members telescoped over said heat distributing cover and secured thereto, each said ring member carrying a plurality of film perforating pins;
  a plurality of circumferentially spaced rows of longitudinally aligned and longitudinally spaced film perforating pins, said pins projecting radially from the periphery of said first roll;
  means for heating said pins, said means including
    an elongate heating unit disposed in each core groove of said first roll;
  a second roll spaced from said first roll and mounted for rotation about a longitudinal axis parallel to the longitudinal axis of said first roll;
  a plurality of circumferentially spaced, longitudinally extending, and resilient ridges formed on the outer periphery of said second roll;
  a plurality of circumferentially spaced and longitudinally extending grooves on the outer periphery of said second roll interspersed with said ridges, said grooves of said second roll being individually adapted to receive the outer ends of a row of pins carried by said first roll; and
  means for guiding film between said first and said second roll with said film being in surface contact with ridges of said second roll, said ridges being adapted to so contact said film with said film being spaced from said periphery of said first roll;
  said ridges and grooves alternating around the circumference of said second roll such that, with some of said ridges in contact with said film, others of said ridges will be approaching said film and still others will be moving away from said film during rotation of said second roll.

5. An apparatus for perforating and feeding thermoplastic film, said apparatus comprising:
  a first roll mounted for rotation about a longitudinal axis;
  a plurality of circumferentially spaced rows of longitudinally aligned and longitudinally spaced film perforating pins, said pins projecting radially from the periphery of said first roll;
  means for heating said pins;
  a second roll spaced from said first roll and mounted for rotation about a longitudinal axis parallel to the longitudinal axis of said first roll;
  a plurality of circumferentially spaced, longitudinally extending, and resilient ridges formed on the outer periphery of said second roll and projecting radially therefrom;
  a plurality of circumferentially spaced and longitudinally extending grooves on the outer periphery of said second roll interspersed with said ridges, said grooves of said second roll being individually adapted to receive the outer ends of a row of pins carried by said first roll;
  means for guiding film between said first and said second roll with said film being in surface contact with ridges of said second roll and spaced from the periphery of said first roll; and
  means for rotating said second roll whereby said film is advanced between said first and second roll by frictional engagement with said ridges of said second roll;
  said ridges and grooves alternating around the circumference of said second roll such that, with some of said ridges in contact with said film, others of said ridges will be approaching said film and still others will be moving away from said film during rotation of said second roll.

6. An apparatus as described in claim 5, including means for moving said first roll away from said second roll without interrupting the driving connection between said first roll and second roll and said drive means.

7. An apparatus for perforating and feeding thermoplastic film, said apparatus comprising:
    a first roll mounted for rotation about a longitudinal axis, said first roll having
        an elongate core including a plurality of circumferentially and uniformly spaced and longitudinally extending grooves formed on its outer periphery,
        a generally cylindrical, heat distributing cover telescoped over said core, and
        a plurality of axially aligned, mutually abutting, heat conducting ring members telescoped over said heat distributing cover and secured thereto, each said ring member carrying a plurality of film perforating pins;
    a plurality of circumferentially spaced rows of longitudinally aligned and longitudinally spaced film perforating pins, said pins projecting radially from the periphery of said first roll;
    means for heating said pins, said means including
        an elongate heating unit disposed in each core groove of said first roll;
    a second roll spaced from said first roll and mounted for rotation about a longitudinal axis parallel to the longitudinal axis of said first roll;
    a plurality of circumferentially spaced, longitudinally extending, and resilient ridges formed on the outer periphery of said second roll and projecting radially therefrom;
    a plurality of circumferentially spaced and longitudinally extending grooves on the outer periphery of said second roll interspersed with said ridges, said grooves of said second roll being individually adapted to receive the outer ends of a row of pins carried by said first roll;
    means for guiding film between said first and second roll with said film being in surface contact with ridges of said second roll and spaced from the periphery of said first roll; and
    means for rotating said second roll whereby said film is advanced between said first and second roll by frictional engagement with said ridges of said second roll, said ridges being adapted to so contact said film with said film being spaced from said periphery of said first roll;
    said ridges and grooves alternating around the circumference of said second roll such that, with some of said ridges in contact with said film, others of said ridges will be approaching said film and still others will be moving away from said film during rotation of said second roll.

8. An apparatus as described in claim 7 wherein each heating unit is adapted to provide a greater degree of heating near the outer ends of said first roll than in the mid portion thereof.

References Cited by the Examiner
UNITED STATES PATENTS

| | | | |
|---|---|---|---|
| 1,234,499 | 7/1917 | Smalley | 219—390 |
| 1,331,486 | 2/1920 | Clark et al. | 219—244 |
| 2,275,612 | 3/1942 | Chandler | 83—16 X |
| 2,388,069 | 10/1945 | Meaker et al. | 219—384 |
| 2,499,961 | 3/1950 | Lennox | 338—218 X |
| 2,627,893 | 2/1953 | Williams | 156—582 |
| 2,693,221 | 11/1954 | Lyijymen | 156—582 X |
| 2,748,863 | 6/1956 | Benton | 83—171 |
| 2,771,534 | 11/1956 | Schwahn | 83—171 |
| 2,779,851 | 1/1957 | Vogt | 219—470 X |
| 2,870,312 | 1/1959 | Westervelt | 219—469 |
| 3,027,285 | 3/1962 | Eisner et al. | 219—470 X |
| 3,054,441 | 9/1962 | Gex et al. | 156—515 |
| 3,074,303 | 1/1963 | Waters. | |
| 3,083,757 | 4/1963 | Kraft et al. | 156—582 X |

RICHARD M. WOOD, *Primary Examiner.*